United States Patent [19]

Jarl et al.

[11] Patent Number: 4,750,579
[45] Date of Patent: Jun. 14, 1988

[54] ARRANGEMENT IN INDUSTRIAL TRUCKS

[75] Inventors: Bernt Jarl, Motala; Tore Gustafsson, Mjölby, both of Sweden

[73] Assignee: Aktiebolaget Bygg-och Transportekonomi (BT), Mjolby, Sweden

[21] Appl. No.: 877,969

[22] Filed: Jun. 24, 1986

[30] Foreign Application Priority Data

Jul. 8, 1985 [SE] Sweden ................... 8503380

[51] Int. Cl.⁴ .............................. B62D 63/00
[52] U.S. Cl. .................. 180/24.02; 180/65.5; 180/209; 280/6 H; 280/6 R; 280/43.12; 280/43.18; 280/92; 280/96.3; 280/696
[58] Field of Search ........... 280/43.12, 43.18, DIG. 1, 280/6 H, 6.1, 92, 96.3, 696, 701; 180/23, 24.02, 65.5, 209; 267/11 R, 11 A, 15 A, 8 B, 34; 187/9 R, ; 254/2 R

[56] References Cited

U.S. PATENT DOCUMENTS

| 1,794,630 | 3/1931 | Linn | 280/43.18 |
| 2,173,737 | 9/1939 | Ulinski | 280/96.3 |
| 3,276,787 | 10/1966 | Klemick et al. | 280/43.12 |
| 3,380,546 | 4/1968 | Rabjohn | 180/65.5 |
| 3,486,333 | 12/1969 | Thomas | 187/9 R |
| 3,598,422 | 8/1971 | Strauff | 280/6 R |
| 3,628,810 | 12/1971 | Graef | 267/34 |
| 4,424,872 | 1/1984 | Granlind et al. | 180/24.02 |

FOREIGN PATENT DOCUMENTS

| 0150830 | 8/1985 | European Pat. Off. . |
| 316722 | 10/1969 | Sweden . |
| 449482 | 7/1985 | Sweden . |
| 870037 | 6/1961 | United Kingdom . |
| 1073186 | 6/1967 | United Kingdom . |
| 1453869 | 10/1976 | United Kingdom . |
| 2067141 | 7/1981 | United Kingdom . |
| 2094727 | 9/1982 | United Kingdom . |

Primary Examiner—John J. Love
Assistant Examiner—Eric Culbreth
Attorney, Agent, or Firm—Frishauf, Holtz, Goodman & Woodward

[57] ABSTRACT

An arrangement in industrial trucks of the kind which include a chassis (3) carried by support wheels (5, 6) which lack spring suspension, and driven by a sprung drive-wheel (7) arranged between two support wheels. A hydraulically operable load carrying device (2) is provided for lifting primarily goods-laden pallets. The sprung movement of the drive-wheel (7) relative to the chassis is effected with the aid of a spring assembly (22) which includes link arms (25, 26) and a spring (24) both being arranged between the chassis and the drive-wheel. The spring (24) includes a hydraulic working piston-cylinder device (27) by means of which the spring assembly can be given a desired spring bias or spring force. The piston-cylinder device is connected to the hydraulic system of the load carrying device in a manner to increase automatically the spring bias, and therewith the pressure exerted by the drive-wheel against the floor or like surface when the load carried increases.

11 Claims, 2 Drawing Sheets

ARRANGEMENT IN INDUSTRIAL TRUCKS

BACKGROUND OF THE INVENTION

The present invention relates to an industrial truck having an arrangement for increasing the braking force of at least one wheel of the industrial truck relative to a driving surface on which the industrial truck is driven, the industrial truck comprising a chassis which is supported on wheels which have substantially no suspension, and which is driven and braked by a sprung drive-wheel arranged between two of the support wheels and a load-carrying device which can be raised and lowered relative to the chassis by means of a hydraulic lifting arrangement intended therefor, and in which trucks there is arranged between the chassis and the drive-wheel a spring assembly which is operative in applying a spring force to the drive-wheel in a direction towards the driving surface on which the truck stands.

Industrial trucks of this kind are used for transporting goods-laden pallets within, for example, industrial premises. The trucks may be intended solely for low lifts, or for both low and high lifts, when handling stock in pallet racks or the like. Normally, the supporting wheels are completely without suspension, whereas the drive-wheel is pressed against the driving surface with a given spring force, in order to hold the wheel in contact with the driving surface when meeting irregularities therein. The magnitude of this spring force is determined by the condition that the chassis must rest on all support wheels, even when being driven with no load, so that stability remains the same, i.e. the spring force must not be of such magnitude that the drive-wheel lifts the support wheels from the driving surface. This means, however, that the surface engagement pressure of the drive-wheel remains unaltered when switching from light to heavier loads, which results in disadvantageous skidding and sliding tendencies, and above all substantially lengthens the braking distance as a result of the increase in kinetic energy. Since trucks of this kind have become progressively lighter in weight in relation to their load carrying capacity and can be driven at high speeds, the aforementioned drawback has reached greater proportions in recent years.

SUMMARY OF THE INVENTION

Consequently, the object of the invention is to provide in trucks of the kind described, an arrangement with which the frictional force between drive-wheel and driving surface, and therewith the braking force, can be increased with increasing load weights on the truck. This object is achieved by providing means for increasing the spring force of the drive-wheel with increasing load-weights carried by the truck, and more specifically by providing means for increasing the spring bias of the spring means. Further objects of the invention and advantages afforded thereby will be evident from the following description. These further objects and advantages are achieved and afforded by the characterizing features set forth in the claims.

BRIEF DESCRIPTION OF DRAWINGS

The invention will now be described in more detail with reference to the accompanying drwings, in which.

DETAILED DESCRIPTION

Figure 1:
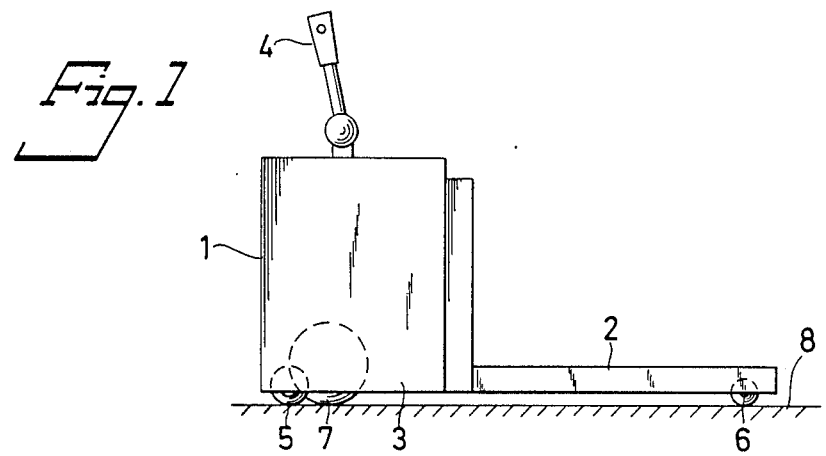
FIG. 1 is a side view of a truck constructed in accordance with the invention.
Figure 2:
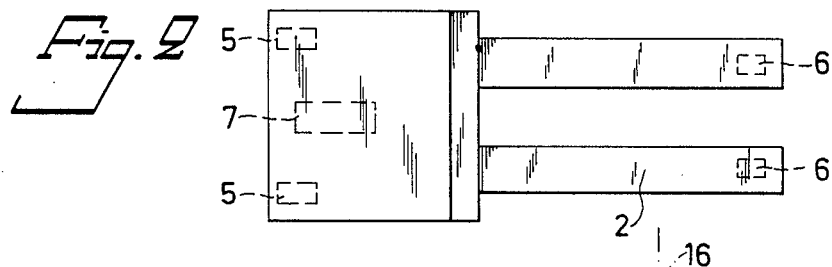
FIG. 2 is a plan view of the truck illustrated in FIG. 1.

The illustrated low-lift truck is of conventional construction and incorporates a battery and motor housing 1, and a load carrying device 2, all supported on a common chassis 3. The truck is steered with the aid of a movable steering handle 4, and may optionally be provided with a driving cabin or similar location, so that the truck operator can accompany the truck while sitting down or standing up. The truck is supported on two front and two back support-wheels 5 and 6 respectively, of which the front wheels have the form of conventional articulated wheels. Arranged on the chassis, centrally between the articulated wheels 5, is a drive-wheel 7 with which the truck is driven, braked, and steered. The support wheels 5, 6 are substantially without any form of spring suspension whatsoever, whereas the drive-wheel 7 is sprung in order to enable it to follow irregularities, in the form of gullies etc., in the driving surface or floor 8. The load carrying device 2 suitably has the form of a fork-lift assembly which can be raised and lowered in a known manner with the aid of a hydraulic ram device 9.

Figure 3:
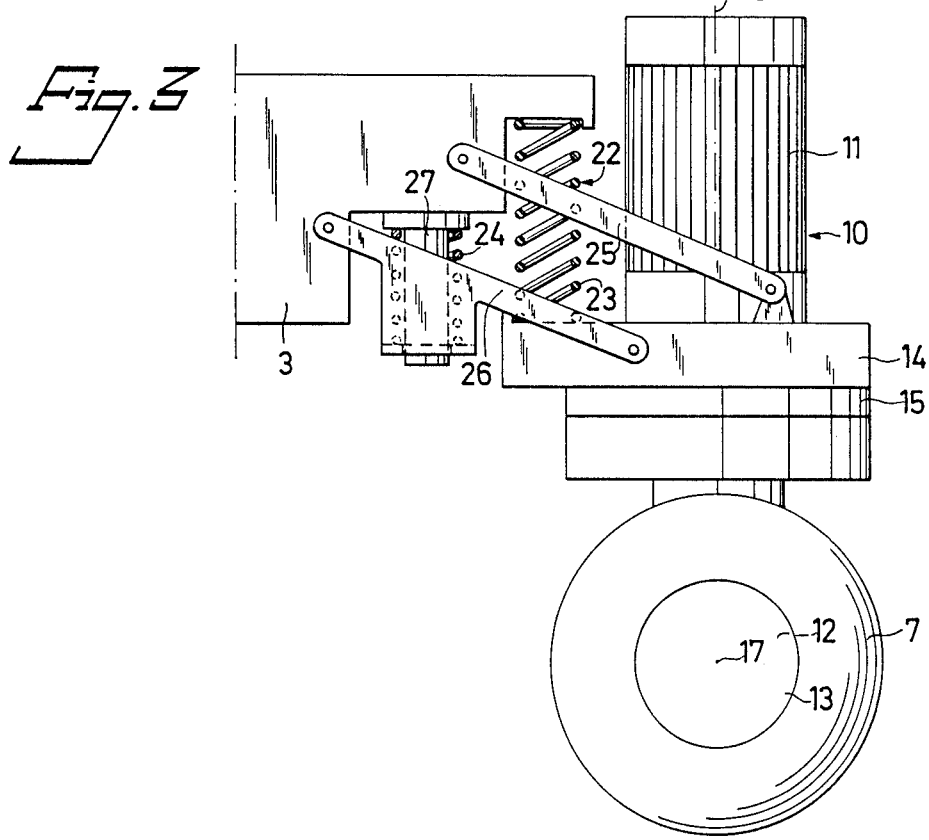
FIG. 3 is a side-view of the drive-wheel and its associated spring assembly, incorporated in the truck illustrated in FIGS. 1 and 2.
Figure 4:
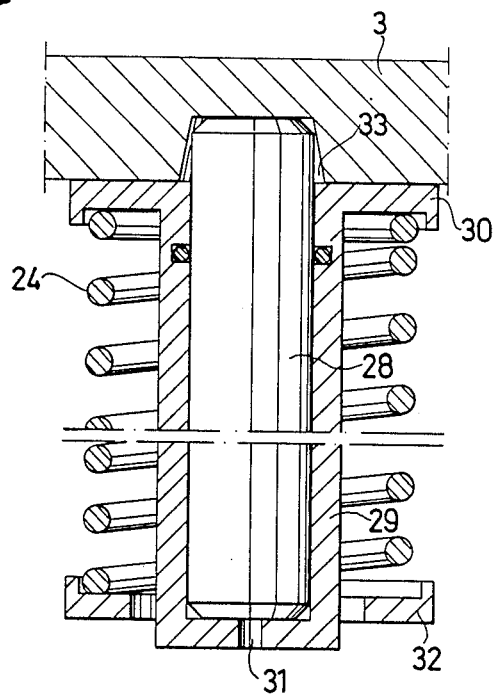
FIG. 4 is a sectional view of part of the spring assembly illustrated in FIG. 3.

The sprung suspension of the drive-wheel 7 is illustrated in FIG. 3, from which it will be seen that the drive-wheel 7 is firmly connected to a power assembly 10, which comprises an electric motor 11 located above the drive-wheel 7 and a gear unit 12 located in the hub 13. The power assembly 10 is carried by a flat motor support 14 and is journalled in relation to said support by means of a bearing 15. The electric motor 11 is arranged vertically so that its rotation axis 16 will be perpendicular to the drive-wheel axis 17. The motor support 14 and thus the power assembly 10 is suspended on the chassis 3 through a spring means 22 incorporating first and second spring elements 23 and 24, and an upper and a lower link-arm pair 25 and 26 which extend parallel with one another between the chassis and the motor support. The first spring element 23 is attached between the chassis 3 and the motor support 14, while the second spring element 24 acts between the chassis and the lower link arms 26. Both spring elements 23, 24 preferably comprise two coil springs. However, whereas the first spring element 23 is arranged to exert a constant force against the driving or floor surface, the second spring element is provided with power means for increasing the spring force with increasing load-weight on the load carrying device 2. This means includes a hydraulic piston-cylinder device 27 whose piston 28 lies against the chassis 3, while the cylinder 29 of said device lies against the upper end of the spring via a flange 30. The working piston-cylinder device is connected to the hydraulic system serving the lifting ram 9 and is fed with hydraulic fluid through an inlet 31. The spring 24 extends around the cylinder 29 and is supported by a connector plate 32 arranged between the lower link arms 26. When the hydraulic pressure increases, the cylinder 29 and associated flange are pressed downwards, therewith compressing the spring 24 and exerting a greater spring force downwardly on the link-arm pair 26 and therewith on the drive-wheel 7. The piston 28 is mounted in an aperture 33 in the chassis 3 in a manner which enables the working cylinder to swing slightly when the link-arms are swung. The spring element is shown in the position taken thereby when no load is placed on the load carrying device 2. In this position, the spring force applied on the drivewheel is adapted to give the wheel a sprung movement of plus or minus 2 mm without risk of any of the support wheels 5 lifting from the floor surface. The link arm system will make the drive-wheel suspension very stable without any risk for binding or jamming. This is particularly important since the vertical movement of the wheel is very small and said movement has to be carried out in spite of strong horizontal forces which act ont he wheel especially when braking.

Figure 5:
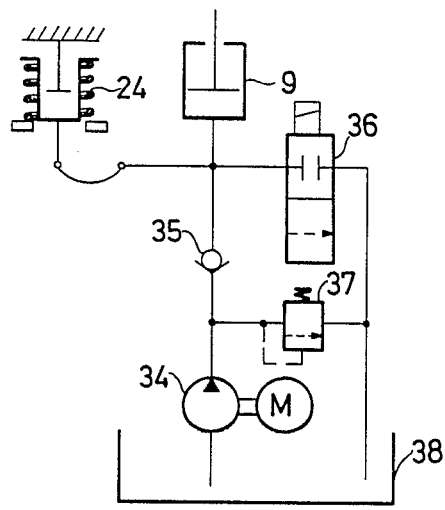
FIG. 5 illustrates a hydraulic circuit for a low-lift truck according to FIGS. 1 and 2.

FIG. 5 illustrates schematically a hydraulic circuit for the aforesaid low-lifting truck. As shown in the illustration, a pump 34 drives hydraulic fluid through a non-return valve 35 to the lifting ram 9, which communicates with the working piston-cylinder device 27 such that the device is subjected to the same hydraulic pressure as the lifting ram. Since the pressure prevailing in the ram is totally dependent on the weight to be carried, the bias or spring force of the spring 24 will also be proportional to the weight of the load. The hydraulic circuit also incorporates conventionally a lowering valve 36 and an overflow valve 37 through which hydraulic fluid can be returned to a tank 38. Thus, the arrangement according to the invention is effective in increasing automatically the pressure of the drive-wheel against the floor or driving surface when the load increases. This increase in wheel pressure results in greater friction between the drive-wheel and the floor surface, and therewith enalbes the braking distance to be shortened considerably in relation to braking distances when the wheel pressure remains unchanged.

Figure 6:
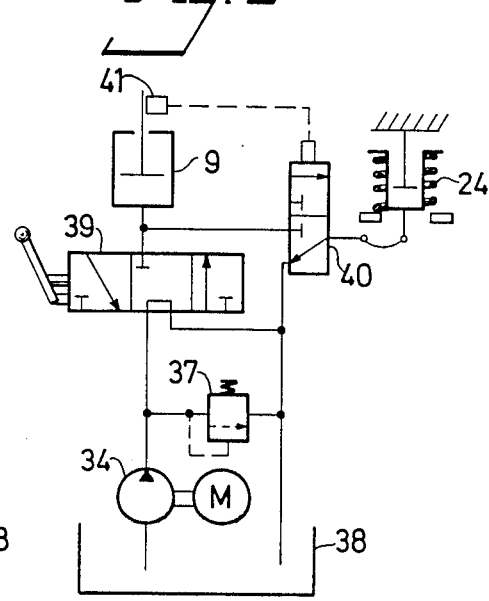
FIG. 6 illustrates a corresponding hydraulic circuit for a high-lift truck.

FIG. 6 illustrates a modified hydraulic circuit intended for high-lift industrial trucks. These trucks are designed for transporting loads to and from pallet stacks or like locations, and for lifting the loads in the actual stack location. The hydraulic circuit incorporates a slide valve 39 or the like, for controlling lifting and lowering movements. A cut-off valve 40 is provided for interrupting communication between the ram 9 and the piston-cylinder device 27 when the load carrying device 2 has reached a given height. This switch-over is effected with the aid of schematically illustrated control means 41, which may comprise, for example, an electric switch and transducer means located on the lifting arrangement. The valve 40 is preferably adapted to take the aforesaid blocking mode when a lifting height of about one metre is reached, whereupon the piston-cylinder 27 is without pressure and is connected to the tank 38. This system enables a full spring force to be exerted on the drive-wheel when the truck is driven with limited raised loads, and further enables the spring force to be reduced when driving loads which are lifted to higher levels, so that the wheel pressure has no deleterious effect on the stability of the truck. This enables the truck to be driven at high speeds to and from the pallet locations while maintaining the desired braking effects. It is always necessary for safety reasons to drive slowly in the actual vicinity of the pallet locations, therewith rendering additional braking force unnecessary, i.e. disconnection of the piston-cylinder device has no real detrimental effect.

It will be understood that the invention is not restricted to the illustrated and described embodiment, and that various modifications can be made within the scope of the following claims.

What is claimed is:

1. In an industrial truck, an arrangement for increasing the braking force of at least one wheel of the industrial truck relative to a driving surface on which the industrial truck is driven, the industrial truck including a chassis carried on support wheels which have substantially no spring suspension and which are driven and braked by a sprung drive-wheel arranged between two of the support wheels and a load carrying device which can be raised and lowered relative to the chassis by means of a hydraulic lifting arrangement, and which truck further includes a spring means arranged between the chassis and the sprung drive-wheel and which is adapted to exert on said drive-wheel a spring force acting towards said driving surface, the improvement wherein said spring means includes:
link arm means arranged between said chassis and said drive-wheel;
a spring;
power means coupled to said spring for adjusting the bias or spring force of said spring means, said power means including means responsive to change in weight of a load carried by said load carrying device for increasing said spring force exerted on said drive wheel and thus said braking force of the industrial truck with increasing weight of the load carried by said load carrying device.

2. An arrangement according to claim 1, wherein:
said load carrying device includes a hydraulic system operatively coupled to said hydraulic lifting arrangement; and
said power means includes a working piston-cylinder device which is connected to said hydraulic system of said load carrying device such that a load-dependent working pressure in said hydraulic system can be transmitted to said piston-cylinder device and influence said spring force.

3. An arrangement according to claim 2, wherein said spring means includes a coil spring placed around said piston-cylinder device.

4. An arrangement according to claim 1, wherein said spring is arranged between one of said at least two link arms and said chassis.

5. An arrangement according to claim 1, wherein said industrial truck includes a power assembly for said drive-wheel, said drive-wheel and its power assembly comprising a unit which is sprung relative to said chassis.

6. An arrangement according to claim 5, wherein said drive-wheel has a wheel-hub, and said power assembly includes an electric motor located above said drive-wheel and a gear unit located at said wheel-hub.

7. An arrangement according to claim 6, wherein said power assembly is carried by a motor support and said link arm means includes at least two link arms which are arranged in parallel between said chassis and said motor support and attached thereto.

8. An arrangement according to claim 7, wherein said spring means includes another spring element arranged between said chassis and said motor support.

9. An arrangement according to claim 8, wherein said electric motor is arranged vertically with its rotation axis arranged perpendicular to the drive-wheel axis, and said power assembly is journalled in relation to said motor support by means of a bearing.

10. An arrangement according to claim 1, further comprising control means cooperatively coupled to said hydraulic lifting arrangement for disconnecting said spring-force increasing power means when said load carrying device lifts a load thereon above a given horizontal level.

11. An arrangement according to claim 1, wherein said link arm means comprises at least two link arms.

* * * * *